(12) United States Patent
Srinivasan et al.

(10) Patent No.: US 7,487,193 B2
(45) Date of Patent: Feb. 3, 2009

(54) FAST VIDEO CODEC TRANSFORM IMPLEMENTATIONS

(75) Inventors: Sridhar Srinivasan, Seattle, WA (US); Jie Liang, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 839 days.

(21) Appl. No.: 10/845,808

(22) Filed: May 14, 2004

(65) Prior Publication Data

US 2005/0256916 A1 Nov. 17, 2005

(51) Int. Cl.
*G06F 17/14* (2006.01)

(52) U.S. Cl. ...................... 708/400; 708/409
(58) Field of Classification Search ........... 708/400, 708/409

See application file for complete search history.

(56) References Cited

U.S. PATENT DOCUMENTS

| | | | |
|---|---|---|---|
| 5,168,375 A | 12/1992 | Reisch et al. | |
| 5,325,215 A | 6/1994 | Shibata et al. | |
| 5,357,594 A | 10/1994 | Fielder | |
| 5,379,351 A | 1/1995 | Fandrianto et al. | |
| 5,430,556 A | 7/1995 | Ito | |
| 5,590,066 A | 12/1996 | Ohki | |
| 5,790,441 A * | 8/1998 | Oami et al. | 708/400 |
| 5,864,637 A | 1/1999 | Liu et al. | |
| 5,970,173 A | 10/1999 | Lee et al. | |
| 5,995,539 A | 11/1999 | Miller | |
| 6,002,801 A | 12/1999 | Strongin et al. | |
| 6,006,179 A | 12/1999 | Wu et al. | |
| 6,029,126 A | 2/2000 | Malvar | |
| 6,057,855 A | 5/2000 | Barkans | |
| 6,058,215 A | 5/2000 | Schwartz et al. | |
| 6,073,153 A | 6/2000 | Malvar | |
| 6,115,689 A | 9/2000 | Malvar | |
| 6,137,916 A * | 10/2000 | Chang et al. | 382/250 |
| 6,154,762 A | 11/2000 | Malvar | |
| 6,301,304 B1 | 10/2001 | Jing et al. | |
| 6,324,560 B1 | 11/2001 | Malvar | |
| 6,356,870 B1 | 3/2002 | Hui et al. | |
| 6,363,117 B1 | 3/2002 | Kok | |
| 6,370,502 B1 | 4/2002 | Wu et al. | |

(Continued)

FOREIGN PATENT DOCUMENTS

CA 2452343 1/2003

(Continued)

OTHER PUBLICATIONS

Wien, "Variable Block-Size Transforms for Hybrid Video Coding," Dissertation, 182 pp. (Feb. 2004).

Hohl, "An 8×8 Discrete Cosine Transform Implementation on the TMS320C25 or the TMS320C30," *Texas Instruments Applicaiton Report SPRA115*, pp. 1-25 (1990) http://focus.ti.com/lit/an/spra115/spra115.pdf [Downloaded from the World Wide Web on Dec. 28, 2005].

(Continued)

*Primary Examiner*—Tan V Mai
(74) *Attorney, Agent, or Firm*—Klarquist Sparkman, LLP

(57) ABSTRACT

A fast implementation of the 8-point transform is realized using a sequence of butterfly operations and matrix multiplies. A fast implementation of the inverse transform is realized by applying inverses of the butterfly operations with the matrix multiplies in reverse flow. These fast implementations permit scaling to be incorporated into the transform stages either at the end of both dimensions of filtering, or separately at each stage. These fast implementations of the transform can be used in encoders and decoders based on this transform in image compression and other signal processing systems.

13 Claims, 6 Drawing Sheets

U.S. PATENT DOCUMENTS

| | | | |
|---|---|---|---|
| 6,389,071 | B1 | 5/2002 | Wilson |
| 6,473,534 | B1 | 10/2002 | Merhav et al. |
| 6,487,574 | B1 | 11/2002 | Malvar |
| 6,496,795 | B1 | 12/2002 | Malvar |
| 6,507,614 | B1 | 1/2003 | Li |
| 6,600,785 | B1 | 7/2003 | Nishigori et al. |
| 6,606,725 | B1 | 8/2003 | Wang et al. |
| 6,687,726 | B1 | 2/2004 | Schneider |
| 6,694,342 | B1 | 2/2004 | Mou |
| 6,701,019 | B1 | 3/2004 | Wu et al. |
| 6,728,317 | B1 | 4/2004 | Demos |
| 6,831,951 | B2 | 12/2004 | Yamada |
| 6,882,685 | B2 | 4/2005 | Malvar |
| 6,944,224 | B2 | 9/2005 | Zhao et al. |
| 7,106,797 | B2 | 9/2006 | Malvar |
| 7,123,655 | B2 | 10/2006 | Kerofsky |
| 2002/0154693 | A1 | 10/2002 | Demos et al. |
| 2003/0006916 | A1 | 1/2003 | Yakamizawa |
| 2005/0213659 | A1* | 9/2005 | Malvar ............... 375/240.03 |
| 2005/0213835 | A1 | 9/2005 | Guangxi et al. |
| 2006/0133481 | A1 | 6/2006 | Chujoh |
| 2007/0027677 | A1 | 2/2007 | Ouyang et al. |

FOREIGN PATENT DOCUMENTS

| | | |
|---|---|---|
| CN | 1452396 | 10/2003 |
| DE | 4133460 A1 | 4/1993 |
| EP | 854653 | 7/1998 |
| JP | 63-219066 | 9/1988 |
| JP | 04-282988 | 10/1992 |
| JP | 06-045948 | 2/1994 |
| JP | 06-045949 | 2/1994 |
| JP | 06-054307 | 2/1994 |
| JP | 09-008665 | 1/1997 |
| JP | 10-091614 | 4/1998 |
| WO | WO 0140985 | 6/2001 |

OTHER PUBLICATIONS

Ishii et al., "Parallel Variable Length Decoding with Inverse Quantization for Software MPEG-2 Decoders," *IEEE Signal Processing Systems*, pp. 500-509 (1997).

Jeong et al., "A Fast Algorithm Suitable for DCT Implementation with Integer Multiplication," *IEEE TENCON*, vol. 2, pp. 784-787 (1996).

Liang et al., "Approximating the DCT with the Lifting Scheme: Systematic Design and Applications," *IEEE Conference Record of the 34th Asilomar Conference*, vol. 1, pp. 192-196 (Oct. 2000).

Malvar, "Low-complexity Length-4 Transform and Quantization with 16-bit Arithmetic," *Proposal, ITU Study Group 16 Question 6 Video Coding Experts Group*, 24 pp., 14th Meeting held Sep. 24-27, 2001, Santa Barbara, CA.

Pei et al., "The Integer Transforms Analogous to Discrete Trigonometric Transforms," *IEEE Transactions on Signal Processing*, vol. 48, No. 12, pp. 3345-3364 (Dec. 2000).

Shao, "Implementing JPEG with TMS320C2xx Assembly Language Software," *Texas Instruments Application Report SPRA615*, pp. 1-48 (Jan. 2000) http://focus.ti.com/lit/an/spra615/spra615.pdf [Downloaded from the World Wide Web on Dec. 28, 2005].

Sriram et al., "MPEG-2 Video decoding on the TMS320C6X DSP Architecture," *IEEE Conference Record on the 32nd Asilomar Conference*, vol. 2, pp. 1735-1739 (1998).

Sullivan et al., "The H.264/AVC Advanced Video Coding Standard: Overview and Introduction to the Fidelity Range Extensions," 21 pp. (Aug. 2004).

Tran, "The BinDCT: Fast Multiplierless Approximation of the DCT," *IEEE Signal Processing Letters*, vol. 7, No. 6, pp. 141-144 (Jun. 2000).

U.S. Appl. No. 60/341,674, filed Dec. 17, 2001, Lee et al.

U.S. Appl. No. 60/488,710, filed Jul. 18, 2003, Srinivasan et al.

U.S. Appl. No. 60/501,081, filed Sep. 7, 2003, Srinivasan et al..

U.S. Appl. No. 60/501,133, filed Sep. 7, 2003, Holcomb et al.

Reader, "History of MPEG Video Compression—Ver. 4.0," 99 pp., document marked Dec. 16, 2003.

ISO/IEC, "ISO/IEC 11172-2, Information technology—Coding of moving pictures and associated audio for digital storage media at up to about 1,5 Mbit/s—Part 2: Video," 112 pp. (1993).

ISO/IEC, "JTC1/SC29/WG11 N2202, Information Technology—Coding of Audio-Visual Objects: Visual, ISO/IEC 14496-2," 329 pp. (1998).

ITU-T, "ITU-T Recommendation H.261, Video Coedec for Audio-visual Services at p x 64 kbits," 25 pp. (1993).

ITU-T, "ITU-T Recommendation H.262, Information Technology—Generic Coding of Moving Pictures and Associated Audio Information: Video," 205 pp. (1995).

ITU-T, "ITU-T Recommendation H.263, Video coding for low bit rate communication," 162 pp. (1998).

Joint Video Team of ISO/IEC MPEG and ITU-T VCEG, "Final Joint Committee Draft of Joint Video Specification (ITU-T Recommendation H.264, ISO/IEC 14496-10 AVC," 206 pp. (Aug. 2002).

Printouts of FTP directories from http://ftp3.itu.ch , 8 pp. (downloaded from the World Wide Web on Sep. 20, 2005.).

Microsoft Corporation, "Microsoft Debuts New Windows Media Player 9 Series, Redefining Digital Media on the PC," 4 pp. (Sep. 4, 2002) [Downloaded from the World Wide Web on Jul. 16, 2004].

Mook, "Next-Gen Windows Media Player Leaks to the Web," *BetaNews*, 18 pp. (Jul. 19, 2002) [Downloaded from the World Wide Web on Mar. 16, 2004].

Bjontegaard, "H.26L Test Model Long Term No. 8 (TML-8) Draft 0," *Video Coding Experts Group (VCEG)*, pp. 1-46.

Calderbank et al., "Wavelet Transforms that Map Integers to Integers," pp. 1-39 (Aug. 1996).

Liang et al., "A 16-bit Architecture for H.26L, Treating DCT Transforms and Quantization," *Thirteenth Meeting*: Austin, Texas, USA, pp. 1-17 (Apr. 2001).

Li et al., "On Implementing Transforms from Integers to Integers," *Department of Electrical Engineering, Princeton University*, pp. 881-885, Jun. 1998.

Rubino et al., "Improved Chen-Smith Image Coder," *Electrical Engineering Department Iniversity of Texas at Arlington*, pp. 267-270, 1993.

J. W. Cooley and J. W. Tukey, "An algorithm for the machine calculation of complex Fourier series," *Math. Computation*, vol. 19, pp. 297-301, 1965.

W. Chen, C. H. Smith, and S. C. Fralick, "A fast computational algorithm for the discrete cosine transform," *IEEE Trans. Commun.*, vol. 25, pp. 1004-1009, Sep. 1977.

H. Malvar, "Fast computation of the discrete cosine transform and the discrete Hartley transform," *IEEE Trans. Acoust., Speech, Signal Processing*, vol. ASSP-35, pp. 1484-1485, Oct. 1987.

C. Loeffler et al., "Practical fast 1-D DCT algorithms with 11 multiplications," *Proc. IEEE ICASSP*, vol. 2, pp. 988-991, Feb. 1989.

J. Liang and T. D. Tran, "Fast multiplierless approximations to the DCT with the lifting scheme", IEEE Trans on Signal Processing, vol. 49, No. 12, 2001.

Cham, W.-K, "Development of integer cosine transforms by the principle of dyadic symmetry," *Communications, Speech and Vision, IEEE Proceedings I* [see also IEEE Proceedings Communications], vol. 136 Issue: 4 , pp. 276-282, Aug. 1989.

Arai, et al., "A Fast DCT-SQ Scheme for Images," The Transactions of the IEICE, vol. E 71, No. 11, No. 1988, pp. 1095-1097.

"B.H.A. Corporation Introduces The XVD™ media Platform," Press Release dated Apr. 24, 2003, 2 pages.

Golston, "Comparing Media Codecs for Video Content," Embedded Systems Conference, 2004, 18 pages.

Johanson, "SIRAM—Scalable Internet Real-time Media Project Report," undated, 11 pages.

Loomis et al., "VC-1 Technical Overview," Apr. 2006, 5 pages.

* cited by examiner

Software 1080 Implementing Video
Encoder/Decoder With Fast
Implementation Of WMV9/VC-9
Transforms

FAST VIDEO CODEC TRANSFORM IMPLEMENTATIONS

TECHNICAL FIELD

The present invention relates to techniques for digitally encoding and processing signals. The invention more particularly relates to fast implementations of a class of computationally efficient transforms in encoding and decoding of signals, such as images and video.

BACKGROUND

Transform coding is a compression technique used in many audio, image and video compression systems. Uncompressed digital image and video is typically represented or captured as samples of picture elements or colors at locations in an image or video frame arranged in a two dimensional grid. For example, a typical format for images consists of a stream of 24-bit color picture element samples arranged as a grid. Each sample is a number representing color components at a pixel location in the grid within a color space, such as RGB, or YIQ, among others. Various image and video systems may use various different color, spatial and time resolutions of sampling.

Uncompressed digital image and video signals can consume considerable storage and transmission capacity. Transform coding reduces the size of digital images and video by transforming the spatial-domain representation of the signal into a frequency-domain (or other like transform domain) representation, and then reducing resolution of certain generally less perceptible frequency components of the transform-domain representation. This generally produces much less perceptible degradation of the digital signal compared to reducing color or spatial resolution of images or video in the spatial domain.

More specifically, a typical transform coding technique divides the uncompressed digital image's pixels into fixed-size two dimensional blocks, each block possibly overlapping with other blocks. A linear transform that does spatial-frequency analysis is applied to each block, which converts the spaced samples within the block to a set of frequency (or transform) coefficients generally representing the strength of the digital signal in corresponding frequency bands over the block interval. For compression, the transform coefficients may be selectively quantized (i.e., reduced in resolution, such as by dropping least significant bits of the coefficient values or otherwise mapping values in a higher resolution number set to a lower resolution), and also entropy or variable-length coded into a compressed data stream. At decoding, the transform coefficients will inversely transform to nearly reconstruct the original color/spatial sampled image/video signal.

Many image and video compression systems, such as MPEG and Windows Media, among others, utilize transforms based on the Discrete Cosine Transform (DCT). The DCT is known to have favorable energy compaction properties that result in near-optimal data compression. In these compression systems, the inverse DCT (IDCT) is employed in the reconstruction loops in both the encoder and the decoder of the compression system for reconstructing individual image blocks. An exemplary implementation of the IDCT is described in "IEEE Standard Specification for the Implementations of 8×8 Inverse Discrete Cosine Transform," IEEE Std. 1180-1990, Dec. 6, 1990.

A drawback to the IDCT transform as defined in the IEEE Std. 1180-1990 is that calculation of the transform involves matrix multiplication of 64-bit floating point numbers, which is computationally expensive. This can limit performance of the image or video compression system, particularly in streaming media and like media playback applications, where the IDCT is performed on large amounts of compressed data on a real-time basis or under other like time constraints.

The Windows Media Video 9 codec (WMV9) standard, which has been proposed for standardization through the Society of Motion Picture and Television Engineers (SMPTE) C24 Technical Committee as Video Codec 9 (VC-9), defines four types of two-dimensional data transforms, which are an 8×8, 8×4, 4×8 and 4×4 transforms. These VC-9 standard transforms have energy compaction properties similar to the DCT, but have implementations based on matrix multiplication operations on integer numbers for computational efficiency. The matrix implementations of the WMV9/VC-9 transforms are described more fully in U.S. Pat. No. 7,242,713, issued Jul. 10, 2007 (the disclosure of which is incorporated herein by reference). The WMV9 specification calls for bit-exact implementations of the inverse transforms.

Fast implementations of linear transforms have a long history. One well-known example of fast transforms is the Fast Fourier Transform (FFT), described in J. W. Cooley and J. W. Tukey, "An Algorithm For The Machine Calculation Of Complex Fourier Series," *Math. Computation*, vol. 19, pp. 297-301, 1965. The FFT realizes an N-point Fourier transform using O(N log N) operations. It is the inherent symmetry of the Fourier transform definition that allows for this simplification. Similar fast implementations have been shown to exist for the Discrete Cosine Transform (DCT), by W. Chen, C. H. Smith and S. C. Fralick, "A Fast Computational Algorithm For The Discrete Cosines Transform," *IEEE Trans. Commun.*, vol. 25, pp. 1004-1009, September 1977; and H. Malvar, "Fast Computation Of The Discrete Cosine Transform And The Discrete Hartley Transform," *IEEE Trans. Acoust., Speech, Signal Processing*, vol. ASSP-35, pp. 1484-1485, October 1987.

Fast transforms have decomposed the matrix multiplication definition of the transform into a series of steps involving the "butterfly" operation. The butterfly is a weighted data exchange between two variables, which are either spatial domain, frequency domain or intermediate variables. For example, the butterfly operation corresponding to the matrix multiplication, $$y = \begin{pmatrix} c & s \\ -s & c \end{pmatrix} x$$

is shown in FIG. 3. This corresponds to a rotation of the original two dimensional vector x about the origin, with a possible scaling factor. The scaling factor is unity if $c^2 + s^2 = 1$. A butterfly operation with real-valued inputs can be implemented with only three real-valued multiplies. In general, the matrix need not correspond to a pure rotation—scaling and shear are possible with no additional complexity.

The four-point WMV9/VC-9 transform permits a fast implementation via a straightforward application of the butterfly operation, as just described.

As discussed above, the 8-point DCT is known to have a fast transform implementation. However, it is not easily translated to the 8-point WMV9/VC-9 transform. The WMV9/VC-9 transform is similar to a DCT but the integer implementation and requirement of bit-exactness makes a direct mapping from any known fast implementation impossible.

As described in U.S. Pat. No. 7,242,713, issued Jul. 10, 2007, the 8-point WMV9/VC-9 transform can be implemented by operations using a pair of even and odd matrices. It is known that the even basis functions (i.e., basis functions 0, 2, 4 and 8) of the DCT can be trivially realized by a series of butterfly operations at the input followed by a four point DCT. This known fast implementation of the DCT translates well to the even matrix for the 8-point WMV9/VC-9 transform.

The known fast implementations, however, do not provide a way to derive a fast implementation of the odd matrix for the 8-point WMV9/VC-9 transform. While the WMV9/VC-9 transform is similar to a DCT, the integer implementation and requirement of bit-exactness in WMV9/VC-9 make a direct mapping from any known fast transform implementation impossible. The analysis and synthesis of the odd basis functions of these transforms cannot be solved with reference to these known fast transform implementations.

SUMMARY

A fast implementation of the 8-point WMV9/VC-9 transform is described herein. The described implementation includes a fast forward and inverse transform implementation for the 8-point WMV9/VC-9 transform, as well as an alternative implementation each. These fast implementations permit scaling to be incorporated into the transform stages either at the end of both dimensions of filtering, or separately at each stage. Also, the fast implementations may be used on the encoder and decoder side of codecs that employ the WMV9/VC-9 transforms, as well as image compression and other signal processing systems.

Additional features and advantages of the invention will be made apparent from the following detailed description of embodiments that proceeds with reference to the accompanying drawings.

DETAILED DESCRIPTION

The following description is directed to fast implementations of a set of transforms defined in the WMV9 and VC-9 codecs, and which can be applied for use in WMV9/VC-9 compliant codecs as well as other two-dimensional media (e.g., video and image) codecs. An exemplary application of the fast implementations of the media coding transforms is in an image or video encoder and decoder. However, the transforms constructed as described herein are not limited to image or video codecs, and can be applied to other media processing systems. Accordingly, the fast implementations of the transforms are described in the context of a generalized image or video encoder and decoder, but alternatively can be incorporated in various types of media signal processing systems that employ these transforms.

1. Generalized Video Encoder and Decoder

Figure 1:
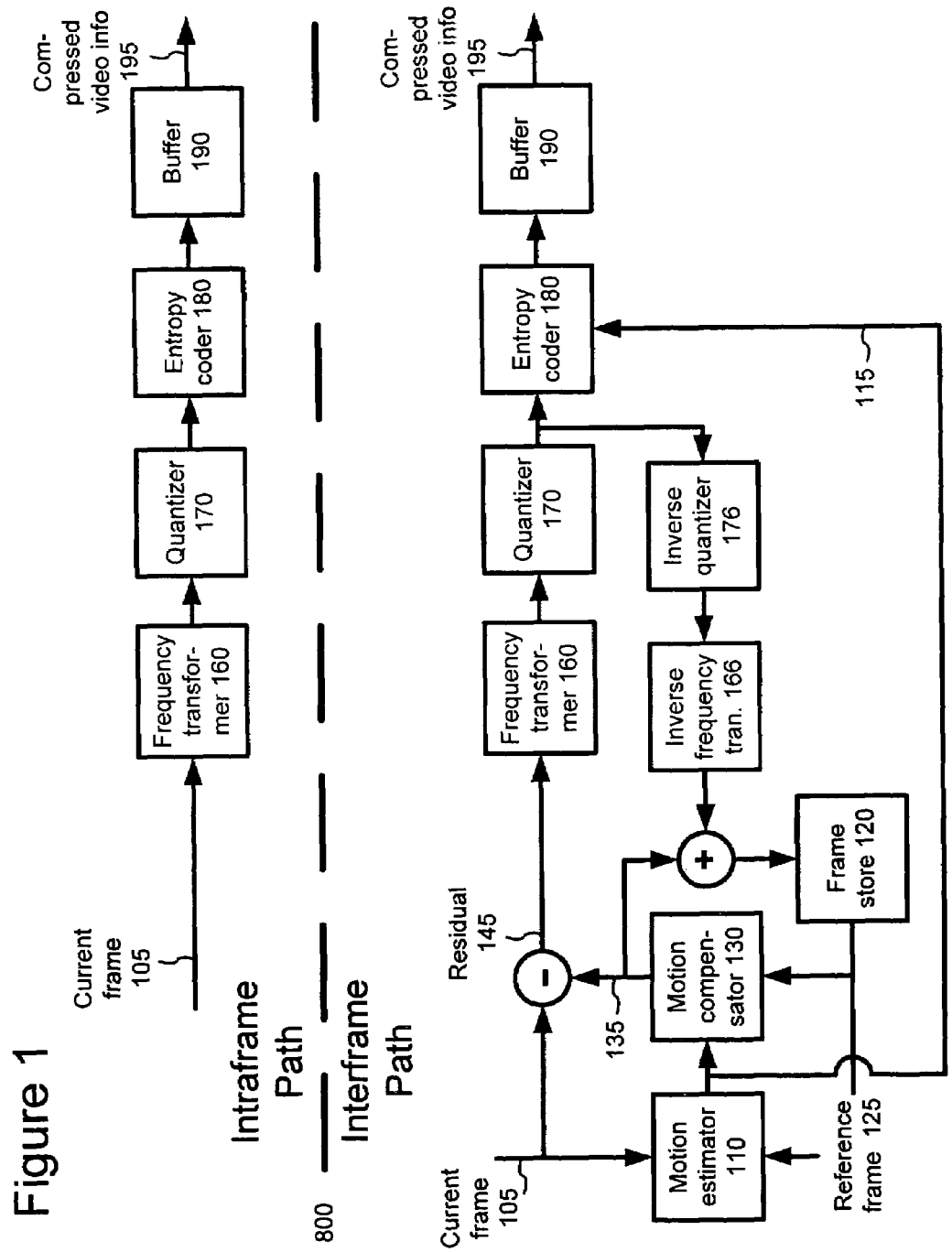
FIG. 1 is a block diagram of a video encoder employing a fast implementation of the WMV9/VC-9 transforms described herein.
Figure 2:
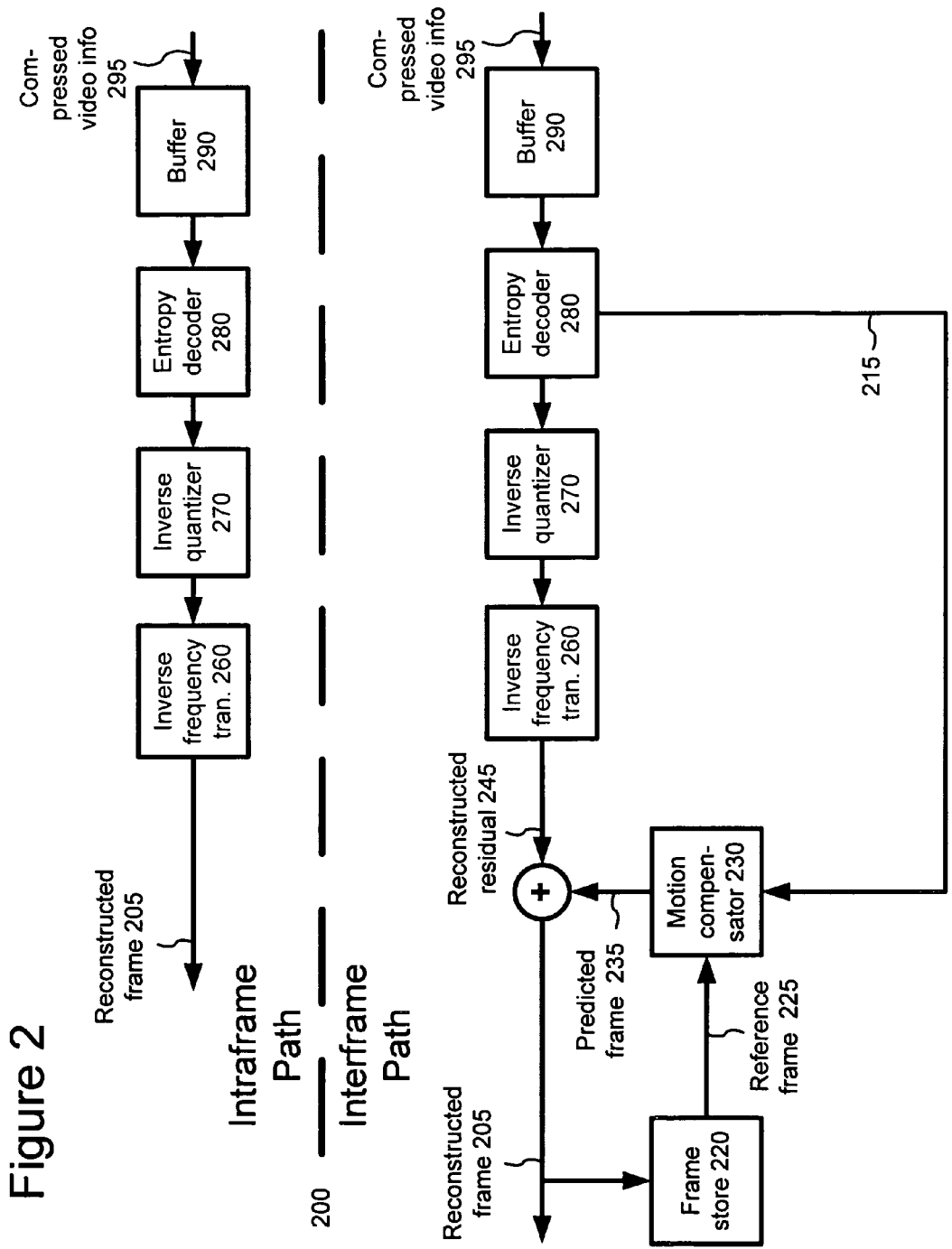
FIG. 2 is a block diagram of a video decoder employing the fast implementation of the WMV9/VC-9 transforms describer herein.
Figure 3:
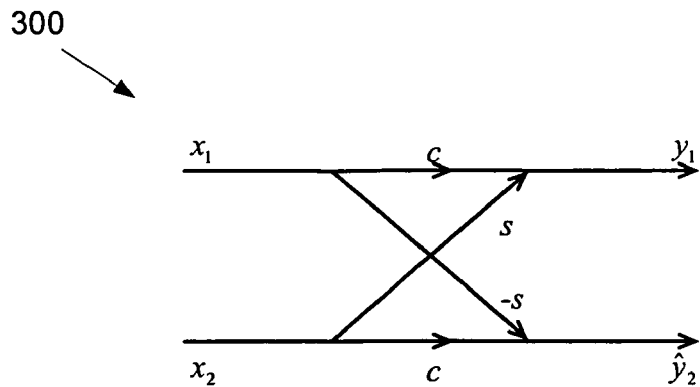
FIG. 3 is a diagram of a butterfly operation of the prior art corresponding to orthonormal rotation.

FIG. 1 is a block diagram of a generalized video encoder (100) and FIG. 2 is a block diagram of a generalized video decoder (200), in which the WMV9/VC-9 transforms can be incorporated.

The relationships shown between modules within the encoder and decoder indicate the main flow of information in the encoder and decoder; other relationships are not shown for the sake of simplicity. In particular, FIGS. 1 and 2 usually do not show side information indicating the encoder settings, modes, tables, etc. used for a video sequence, frame, macroblock, block, etc. Such side information is sent in the output bitstream, typically after entropy encoding of the side information. The format of the output bitstream can be a Windows Media Video format or another format.

The encoder (100) and decoder (200) are block-based and use a 4:2:0 macroblock format with each macroblock including 4 luminance 8×8 luminance blocks (at times treated as one 16×16 macroblock) and two 8×8 chrominance blocks. Alternatively, the encoder (100) and decoder (200) are object-based, use a different macroblock or block format, or perform operations on sets of pixels of different size or configuration than 8×8 blocks and 16×16 macroblocks.

Depending on implementation and the type of compression desired, modules of the encoder or decoder can be added, omitted, split into multiple modules, combined with other modules, and/or replaced with like modules. In alternative embodiments, encoder or decoders with different modules and/or other configurations of modules perform one or more of the described techniques.

A. Video Encoder

FIG. 1 is a block diagram of a general video encoder system (100). The encoder system (100) receives a sequence of video frames including a current frame (105), and produces compressed video information (195) as output. Particular embodiments of video encoders typically use a variation or supplemented version of the generalized encoder (100).

The encoder system (100) compresses predicted frames and key frames. For the sake of presentation, FIG. 1 shows a path for key frames through the encoder system (100) and a path for forward-predicted frames. Many of the components of the encoder system (100) are used for compressing both key frames and predicted frames. The exact operations performed by those components can vary depending on the type of information being compressed.

A predicted frame [also called p-frame, b-frame for bi-directional prediction, or inter-coded frame] is represented in terms of prediction (or difference) from one or more other frames. A prediction residual is the difference between what was predicted and the original frame. In contrast, a key frame [also called i-frame, intra-coded frame] is compressed without reference to other frames.

If the current frame (105) is a forward-predicted frame, a motion estimator (110) estimates motion of macroblocks or other sets of pixels of the current frame (105) with respect to a reference frame, which is the reconstructed previous frame (125) buffered in the frame store (120). In alternative embodiments, the reference frame is a later frame or the current frame is bi-directionally predicted. The motion estimator (110) outputs as side information motion information (115) such as motion vectors. A motion compensator (130) applies the motion information (115) to the reconstructed previous frame (125) to form a motion-compensated current frame (135). The prediction is rarely perfect, however, and the difference between the motion-compensated current frame (135) and the original current frame (105) is the prediction residual (145). Alternatively, a motion estimator and motion compensator apply another type of motion estimation/compensation.

A frequency transformer (160) converts the spatial domain video information into frequency domain (i.e., spectral) data. For block-based video frames, the frequency transformer (160) applies a transform described in the following sections that has properties similar to the discrete cosine transform ["DCT"]. In some embodiments, the frequency transformer (160) applies a frequency transform to blocks of spatial prediction residuals for key frames. The frequency transformer (160) can apply an 8×8, 8×4, 4×8, or other size frequency transforms.

A quantizer (170) then quantizes the blocks of spectral data coefficients. The quantizer applies uniform, scalar quantization to the spectral data with a step-size that varies on a frame-by-frame basis or other basis. Alternatively, the quantizer applies another type of quantization to the spectral data coefficients, for example, a non-uniform, vector, or non-adaptive quantization, or directly quantizes spatial domain data in an encoder system that does not use frequency transformations. In addition to adaptive quantization, the encoder (100) can use frame dropping, adaptive filtering, or other techniques for rate control.

When a reconstructed current frame is needed for subsequent motion estimation/compensation, an inverse quantizer (176) performs inverse quantization on the quantized spectral data coefficients. An inverse frequency transformer (166) then performs the inverse of the operations of the frequency transformer (160), producing a reconstructed prediction residual (for a predicted frame) or a reconstructed key frame. If the current frame (105) was a key frame, the reconstructed key frame is taken as the reconstructed current frame (not shown). If the current frame (105) was a predicted frame, the reconstructed prediction residual is added to the motion-compensated current frame (135) to form the reconstructed current frame. The frame store (120) buffers the reconstructed current frame for use in predicting the next frame. In some embodiments, the encoder applies a deblocking filter to the reconstructed frame to adaptively smooth discontinuities in the blocks of the frame.

The entropy coder (180) compresses the output of the quantizer (170) as well as certain side information (e.g., motion information (115), quantization step size). Typical entropy coding techniques include arithmetic coding, differential coding, Huffman coding, run length coding, LZ coding, dictionary coding, and combinations of the above. The entropy coder (180) typically uses different coding techniques for different kinds of information (e.g., DC coefficients, AC coefficients, different kinds of side information), and can choose from among multiple code tables within a particular coding technique.

The entropy coder (180) puts compressed video information (195) in the buffer (190). A buffer level indicator is fed back to bitrate adaptive modules. The compressed video information (195) is depleted from the buffer (190) at a constant or relatively constant bitrate and stored for subsequent streaming at that bitrate. Alternatively, the encoder system (100) streams compressed video information immediately following compression.

Before or after the buffer (190), the compressed video information (195) can be channel coded for transmission over the network. The channel coding can apply error detection and correction data to the compressed video information (195).

B. Video Decoder

FIG. 2 is a block diagram of a general video decoder system (200). The decoder system (200) receives information (295) for a compressed sequence of video frames and produces output including a reconstructed frame (205). Particular embodiments of video decoders typically use a variation or supplemented version of the generalized decoder (200).

The decoder system (200) decompresses predicted frames and key frames. For the sake of presentation, FIG. 2 shows a path for key frames through the decoder system (200) and a path for forward-predicted frames. Many of the components of the decoder system (200) are used for compressing both key frames and predicted frames. The exact operations performed by those components can vary depending on the type of information being compressed.

A buffer (290) receives the information (295) for the compressed video sequence and makes the received information available to the entropy decoder (280). The buffer (290) typically receives the information at a rate that is fairly constant over time, and includes a jitter buffer to smooth short-term variations in bandwidth or transmission. The buffer (290) can include a playback buffer and other buffers as well. Alternatively, the buffer (290) receives information at a varying rate. Before or after the buffer (290), the compressed video information can be channel decoded and processed for error detection and correction.

The entropy decoder (280) entropy decodes entropy-coded quantized data as well as entropy-coded side information (e.g., motion information, quantization step size), typically applying the inverse of the entropy encoding performed in the encoder. Entropy decoding techniques include arithmetic decoding, differential decoding, Huffman decoding, run length decoding, LZ decoding, dictionary decoding, and combinations of the above. The entropy decoder (280) frequently uses different decoding techniques for different kinds of information (e.g., DC coefficients, AC coefficients, different kinds of side information), and can choose from among multiple code tables within a particular decoding technique.

If the frame (205) to be reconstructed is a forward-predicted frame, a motion compensator (230) applies motion information (215) to a reference frame (225) to form a prediction (235) of the frame (205) being reconstructed. For example, the motion compensator (230) uses a macroblock motion vector to find a macroblock in the reference frame (225). A frame buffer (220) stores previous reconstructed frames for use as reference frames. Alternatively, a motion compensator applies another type of motion compensation. The prediction by the motion compensator is rarely perfect, so the decoder (200) also reconstructs prediction residuals.

When the decoder needs a reconstructed frame for subsequent motion compensation, the frame store (220) buffers the reconstructed frame for use in predicting the next frame. In some embodiments, the encoder applies a deblocking filter to the reconstructed frame to adaptively smooth discontinuities in the blocks of the frame.

An inverse quantizer (270) inverse quantizes entropy-decoded data. In general, the inverse quantizer applies uniform, scalar inverse quantization to the entropy-decoded data with a step-size that varies on a frame-by-frame basis or other basis. Alternatively, the inverse quantizer applies another type of inverse quantization to the data, for example, a non-uniform, vector, or non-adaptive quantization, or directly inverse quantizes spatial domain data in a decoder system that does not use inverse frequency transformations.

An inverse frequency transformer (260) converts the quantized, frequency domain data into spatial domain video information. For block-based video frames, the inverse frequency transformer (260) applies an inverse transform described in the following sections. In some embodiments, the inverse frequency transformer (260) applies an inverse frequency transform to blocks of spatial prediction residuals for key frames. The inverse frequency transformer (260) can apply an 8×8, 8×4, 4×8, or other size inverse frequency transforms.

2. WMV9/VC-9 Transforms

WMV9/VC-9 standard defines transforms that can be used as the frequency transform 160 and inverse frequency transform 260 in the video encoder 100 (FIG. 1) and video decoder 200 (FIG. 2). The WMV9/VC-9 standard defines four types of two-dimensional data transforms, which are the 8×8, 8×4, 4×8 and 4×4 transforms. The specification calls for a bit-exact implementation of the inverse transforms, as per the definition summarized below.

A. WMV9/VC-9 Transform Definition

The 2D transforms used in WMV9/VC-9 are separable, and transformation is performed in each direction using an appropriately defined scaled near-orthonormal multiplier matrix. Two matrices, one each for the 4 point and for the 8 point one-dimensional transform, are defined as follows. All variables are assumed to be integers.

$$T_4 = \begin{bmatrix} 17 & 17 & 17 & 17 \\ 22 & 10 & -10 & -22 \\ 17 & -17 & -17 & 17 \\ 10 & -22 & 22 & -10 \end{bmatrix}$$

$$T_8 = \begin{bmatrix} 12 & 12 & 12 & 12 & 12 & 12 & 12 & 12 \\ 16 & 15 & 9 & 4 & -4 & -9 & -15 & -16 \\ 16 & 6 & -6 & -16 & -16 & -6 & 6 & 16 \\ 15 & -4 & -16 & -9 & 9 & 16 & 4 & -15 \\ 12 & -12 & -12 & 12 & 12 & -12 & -12 & 12 \\ 9 & -16 & 4 & 15 & -15 & -4 & 16 & -9 \\ 6 & -16 & 16 & -6 & -6 & 16 & -16 & 6 \\ 4 & -9 & 15 & -16 & 16 & -15 & 9 & -4 \end{bmatrix}$$

The inverse transform is spelt out in the format specification since all compliant decoders are required to provide a bit-exact output. The transform is defined as follows: First, the rows of the dequantized transform matrix are inverse transformed. This is followed by inverse transformation of the columns.

Let D denote the dequantized transform matrix, $D_1$ the output of the first stage of transformation and R the reconstructed output after row and column wise inverse transformation. D, $D_1$ and R are isomorphic 8×8, 8×4, 4×8 and 4×4 matrices of the same size as the transform size desired. In an abuse of notation, operations involving a matrix and a scalar are defined in this document as entrywise operations on the matrix. Likewise, scalar operations with a matrix argument are defined as entrywise scalar operations on the matrix. A sum of a matrix and a vector is shorthand notation for the entrywise sum of the matrix and a scalar whose value is derived from the co-located row or column of the vector (based on whether the vector is a column or row vector respectively).

The canonical formula for the m×n inverse transformation is $$R = \frac{(T'_n \cdot D \cdot T_m)}{1024}$$

The denominator is chosen to be the power of 2 closest to the squared norm of the basis functions of the 1D transformation (which is one of {4×288, 4×289, 4×292}). Since the ratio between the actual norms and the denominator (around 1.12) is close to 1, there is close correspondence between the quantization parameter used for the IDCT and that used for the WMV9/VC-9 transform. There is no additional error introduced here since all remaining normalization (essentially by 1024/squared norm of basis function) is performed in the forward transform process—this is described further ahead in the document.

In practice, the division by 1024 is implemented as a rounding operation which is split across both 1D transform processes. Further, a 16 bit inverse transform is realized with maximum retention of accuracy by splitting the second stage matrix into even and odd components as defined below:

$$T_8 = 2 \cdot T_8^e + T_8^o$$

$$T_4 = 2 \cdot T_4^e + T_4^o.$$

The odd components $T_8^o$ and $T_4^o$ are only permitted to have 0, 1 and −1 as entries.

Since most of the entries of $T_8$ are even, $T_8^o$ is a sparse matrix. Likewise, $T_4^o$ has a structure highly correlated with $T_4^e$. The WMV9/VC-9 canonical representation of the inverse transform process is now defined as $$D_1 = \frac{(D \cdot T_m)}{8}$$

$$D = \frac{\left(T_n'^e \cdot D_1 + \frac{T_n'^o \cdot D_1}{2}\right)}{64}.$$

Since the even component has half the range of $T_n$, and since the odd component $T_n^o$ is limited to have 0, 1 and −1 entries, the resulting numerator in the second stage of transform can be shown to be range limited to 16 bits. There is a minor computational penalty to pay for the extra bit. Nevertheless, this decomposition of the transformation matrix results in improved arithmetic precision at negligible cost.

The odd and even components of the 4 and 8 point transforms are shown below:

$$T_4^e = \begin{bmatrix} 8 & 8 & 8 & 8 \\ 11 & 5 & -5 & -11 \\ 8 & -8 & -8 & 8 \\ 5 & -11 & 11 & -5 \end{bmatrix}$$

$$T_4^o = \begin{bmatrix} 1 & 1 & 1 & 1 \\ 0 & 0 & 0 & 0 \\ 1 & -1 & -1 & 1 \\ 0 & 0 & 0 & 0 \end{bmatrix}$$

-continued $$T_8^e = \begin{bmatrix} 6 & 6 & 6 & 6 & 6 & 6 & 6 & 6 \\ 8 & 7 & 4 & 2 & -2 & -4 & -7 & -8 \\ 8 & 3 & -3 & -8 & -8 & -3 & 3 & 8 \\ 7 & -2 & -8 & -5 & 5 & 8 & 2 & -7 \\ 6 & -6 & -6 & 6 & 6 & -6 & -6 & 6 \\ 4 & -8 & 2 & 7 & -7 & -2 & 8 & -4 \\ 3 & -8 & 8 & -3 & -3 & 8 & -8 & 3 \\ 2 & -5 & 7 & -8 & 8 & -7 & 5 & -2 \end{bmatrix}$$

$$T_8^o = \begin{bmatrix} 0 & 0 & 0 & 0 & 0 & 0 & 0 & 0 \\ 0 & 1 & 1 & 0 & 0 & -1 & -1 & 0 \\ 0 & 0 & 0 & 0 & 0 & 0 & 0 & 0 \\ 1 & 0 & 0 & 1 & -1 & 0 & 0 & -1 \\ 0 & 0 & 0 & 0 & 0 & 0 & 0 & 0 \\ 1 & 0 & 0 & 1 & -1 & 0 & 0 & -1 \\ 0 & 0 & 0 & 0 & 0 & 0 & 0 & 0 \\ 0 & 1 & 1 & 0 & 0 & -1 & -1 & 0 \end{bmatrix}$$

Postmultiplication by $T_4^o$ is can be simplified as $$W \cdot T_4^o = [W_1 \quad W_2 \quad W_2 \quad W_1], \text{ where}$$

$$[W_1 \quad W_2] = W \cdot \begin{bmatrix} 1 & 1 \\ 0 & 0 \\ 1 & -1 \\ 0 & 0 \end{bmatrix}$$

which is a trivial butterfly operation. Likewise, postmultiplication by $T_8^o$ is tantamount to merely two additions (and negations):

$$W \cdot T_8^o = [W_1 \quad W_2 \quad W_2 \quad W_1 \quad -W_1 \quad -W_2 \quad -W_2 \quad -W_1], \text{ where}$$

$$[W_1 \quad W_2] = W \cdot \begin{bmatrix} 0 & 0 \\ 0 & 1 \\ 0 & 0 \\ 1 & 0 \\ 0 & 0 \\ 1 & 0 \\ 0 & 0 \\ 0 & 1 \end{bmatrix}$$

B. 8×8 Inverse Transform

The row-wise inverse transform is performed first as follows:

$$D_1 = (D \cdot T_8 + 4) >> 3$$

The column-wise inverse transform is defined by looking at the odd component of $T_8$ to compute the two common rows of 8 elements. These are right-shifted by one bit and then added to (or subtracted from) the even component product, before the result is rounded down by 6 bits. The operation is as follows:

$$[D_{1a} \quad D_{1b}] = D_1' \cdot \begin{bmatrix} 0 & 0 \\ 0 & 1 \\ 0 & 0 \\ 1 & 0 \\ 0 & 0 \\ 1 & 0 \\ 0 & 0 \\ 0 & 1 \end{bmatrix} \quad (1)$$

$$D_{2a}' = D_{1a} >> 1$$

$$D_{2b}' = D_{1b} >> 1$$

$$R = \left( T_8''^e \cdot D_1 + \begin{bmatrix} D_{2a} \\ D_{2b} \\ D_{2b} \\ D_{2a} \\ -D_{2a} \\ -D_{2b} \\ -D_{2b} \\ -D_{2a} \end{bmatrix} + 32 \right) >> 6$$

C. 4×8 Inverse Transform

According to the WMV9/VC-9 convention, "4×8" refers to an array with 4 columns and 8 rows. The row-wise inverse transform is a 4 point operation defined as $$D_1 = (D \cdot T_4 + 4) >> 3$$

The second part of the transform, along the columns is identical to the second part of the 8×8 transform, and is defined in Equation (1) above.

D. 8×4 Inverse Transform

According to the WMV9/VC-9 convention, "8×4" refers to an array with 8 columns and 4 rows. The first stage of the 8×4 transform operates on the 4 rows of 8 entries each according to $$D_1 = (D \cdot T_8 + 4) >> 3$$

The column-wise 4 point inverse transform for the second stage is defined below:

$$[D_{1a} \quad D_{1b}] = D_1' \cdot \begin{bmatrix} 1 & 1 \\ 0 & 0 \\ 1 & -1 \\ 0 & 0 \end{bmatrix} \quad (2)$$

$$D_{2a}' = D_{1a} >> 1$$

$$D_{2b}' = D_{1b} >> 1$$

$$R = \left( T_4''^e \cdot D_1 + \begin{bmatrix} D_{2a} \\ D_{2b} \\ D_{2b} \\ D_{2a} \end{bmatrix} + 32 \right) >> 6$$

E. 4×4 Inverse Transform

The first stage of the 4×4 inverse transform is the row-wise operation, which is a 4 point inverse transform defined as $$D_1 = (D \cdot T_4 + 4) >> 3$$

The second part of the transform, along the columns is identical to the second part of the 8×4 transform, and is defined in Equation (2) above.

F. Alternative Implementations of the Inverse Transforms

The definition of the second stage of the inverse transform using odd and even components of the transform matrix is required to achieve a 16 bit implementation with maximum retention of accuracy. If the 16 bit word size is riot an issue (for instance on application specific integrated circuits or ASICs), a 17 bit intermediate result can be used to simplify some of the underlying arithmetic. Alternate definitions of the transforms producing bitexact results compared to the definitions in the previous section can be derived. Since the first stage of these implementations is identical to the first stage of the original definitions, only the second stages are defined below:

The 8×8 and 4×8 inverse transform has the second stage:

$$R = \left( T_8^t \cdot D_1 + \begin{bmatrix} 64 \\ 64 \\ 64 \\ 64 \\ 65 \\ 65 \\ 65 \\ 65 \end{bmatrix} \right) \gg 7$$

The 8×4 and 4×4 inverse transform has the second stage:

$$R = \left( T_4^t \cdot D_1 + \begin{bmatrix} 64 \\ 64 \\ 64 \\ 64 \end{bmatrix} \right) \gg 7$$

G. Forward Transform Definition

The forward transform is obtained by a similar process, except that (i) the transform matrices are transposed and (ii) the scaling factors are different. Since the forward transform need not be implemented in a bitexact manner on the encoder side, the assumption of integer variables is no longer required—indeed the forward transform may be implemented using floating point or scaled fixed point arithmetic. The matrix-multiplication representation of the forward transform shown below is purely an analytical representation unlike for the inverse transform where the matrix multiplies specifically referred to integer multiplications with 16 bit registers. Rounding between stages may be done as necessary and this choice is left to the encoder. The prototypical definitions of the forward transforms are given below:

The 4×4, 4×8, 8×4 and 8×8 transforms of the data matrix D can be calculated using the following set of equation s for these four cases:

$$\hat{D} = (T_4 D T_4') o N_{44}$$

$$\hat{D} = (T_8 D T_4') o N_{48}$$

$$\hat{D} = (T_4 D T_8') o N_{84}$$

$$\hat{D} = (T_8 D T_8') o N_{88}$$

where the operator o is a componentwise multiplication. The normalization matrices $N_{ij}$ are given by $$N_{ij} = c_j c_i'$$

where the column vectors c are $$c_4 = \left( \frac{8}{289} \quad \frac{8}{292} \quad \frac{8}{289} \quad \frac{8}{292} \right)'$$

$$c_8 = \left( \frac{8}{288} \quad \frac{8}{289} \quad \frac{8}{292} \quad \frac{8}{289} \quad \frac{8}{288} \quad \frac{8}{289} \quad \frac{8}{292} \quad \frac{8}{289} \right)'$$

Again, normalization may be done once at the end of all multiplies, or separately at each stage. This is an encoder choice. The output may be scaled up by a power of 2 to facilitate more accuracy in the forward quantization process.

3. Fast Implementation of the WMV9/VC-9 Transforms

This section describes fast implementations of the above-described WMV9/VC-9 transforms. Essentially, speedup of the forward transform process can be achieved by speeding up the matrix multiplication $T_4D$ and $T_8D$, since each transform stage is a matrix multiply of this form. Likewise, the inverse transform can be sped up by speeding up the matrix multiplication $T_4'D$ and $T_8'D$.

Figure 4:
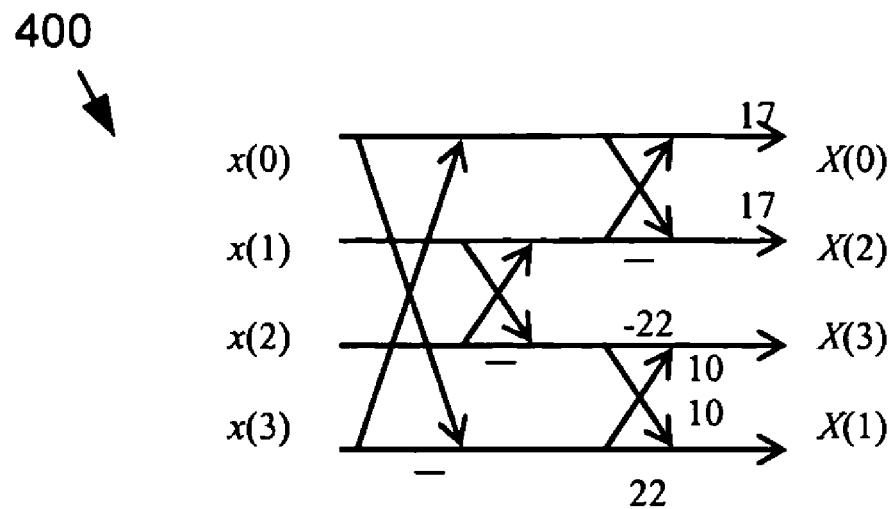
FIG. 4 is a block diagram of a fast implementation of the 4-point WMV9/VC-9 forward transform without scaling.
Figure 5:
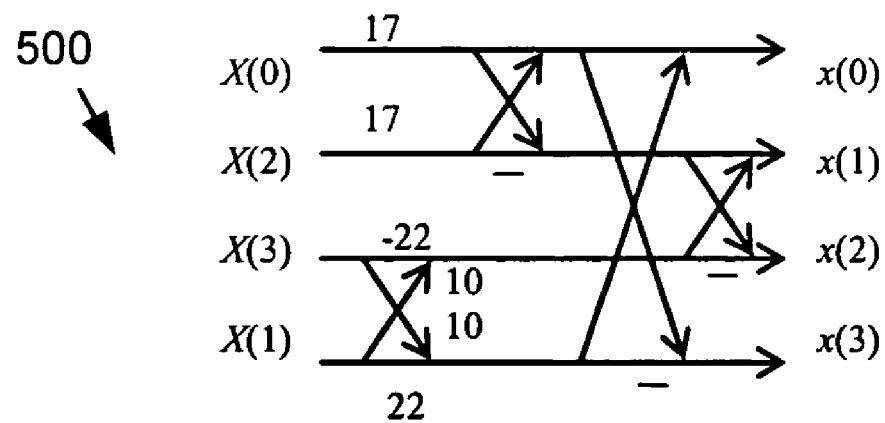
FIG. 5 is a block diagram of a fast implementation of the 4-point WMV9/VC-9 inverse transform without scaling.

The four point WMV9/VC-9 transform, which is the matrix multiply $T_4D$, permits a fast implementation via a straight-forward application of the butterfly operation as shown in FIG. 4. FIG. 5 shows the fast implementation of the 4-point inverse transform, i.e. the matrix multiply $T_4'D$. As expected, the signal flow graph is reversed from that of the forward transform. Scaling is ignored in these figures—scaling can be rolled into the multipliers if floating point operations are used in the forward transform. Else, if an integer implementation is desired, scaling is preferably done at the end of both stages of the forward transform, if not in the quantization stage. For the inverse transform, scaling must be performed as defined in the earlier sections of this document to be WMV9/VC-9 compliant.

Figure 6:
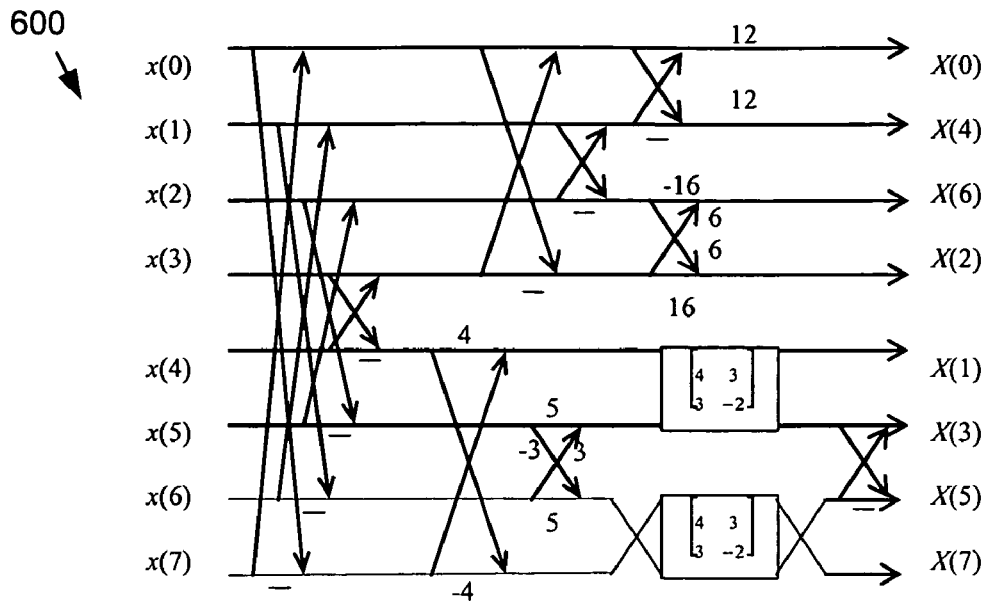
FIG. 6 is a block diagram of a fast implementation of the 8-point WMV9/VC-9 forward transform without scaling.

Although the 8-point DCT is known to have a fast transform implementation, it is not easily translated to the 8-point WMV9/VC-9 transform. The WMV9/VC-9 transform is similar to a DCT but the integer implementation and requirement of bitexactness makes a direct mapping from any known fast implementation impossible. It is also known that the even basis functions (i.e., basis functions 0, 2, 4 and 8) of the DCT can be trivially realized by a series of butterflies at the input followed by a four point DCT—this fact translates to the 8-point WMV9/VC-9 transform as well. Therefore, the real challenge in deriving a fast implementation of the 8 point WMV9 transform is the analysis and synthesis of the odd basis functions. This challenge is addressed below. FIG. 6 shows the fast implementation of the 8-point forward WMV9/VC-9 transform. The (spatial domain) inputs are on the left and the (transform domain) outputs are on the right. The four outputs at the top right correspond to the even bases, which have similarity with the 4 point transform in FIG. 4. The matrix multiply corresponding to the odd bases is as follows:

$$T_8^{odd} = \begin{bmatrix} 16 & 15 & 9 & 4 & -4 & -9 & -15 & -16 \\ 15 & -4 & -16 & -9 & 9 & 16 & 4 & -15 \\ 9 & -16 & 5 & 15 & -15 & -4 & 16 & -9 \\ 4 & -9 & 15 & -16 & 16 & -15 & 9 & -4 \end{bmatrix}$$

It can be seen that the rows are odd-symmetric about the center, which is exploited by the first butterfly stage. The resulting matrix multiply of the "difference" terms of the four butterflies is by $$T^{odd} = \begin{bmatrix} 16 & 15 & 9 & 4 \\ 15 & -4 & -16 & -9 \\ 9 & -16 & 4 & 15 \\ 4 & -9 & 15 & -16 \end{bmatrix}$$

This 4×4 matrix can be decomposed as follows:

$$T^{odd} = \begin{bmatrix} 1 & 0 & 0 & 0 \\ 0 & 1 & 1 & 0 \\ 0 & 1 & -1 & 0 \\ 0 & 0 & 0 & 1 \end{bmatrix} \cdot \begin{bmatrix} 4 & 3 & 0 & 0 \\ 3 & -2 & 0 & 0 \\ 0 & 0 & -2 & 3 \\ 0 & 0 & 3 & 4 \end{bmatrix} \cdot \begin{bmatrix} 4 & 0 & 0 & 1 \\ 0 & 5 & 3 & 0 \\ 0 & -3 & 5 & 0 \\ 1 & 0 & 0 & -4 \end{bmatrix}$$

The above decomposition leads to the butterfly representation shown in FIG. 6. Since the component matrices are also integer valued, bitexactness is maintained.

Figure 7:
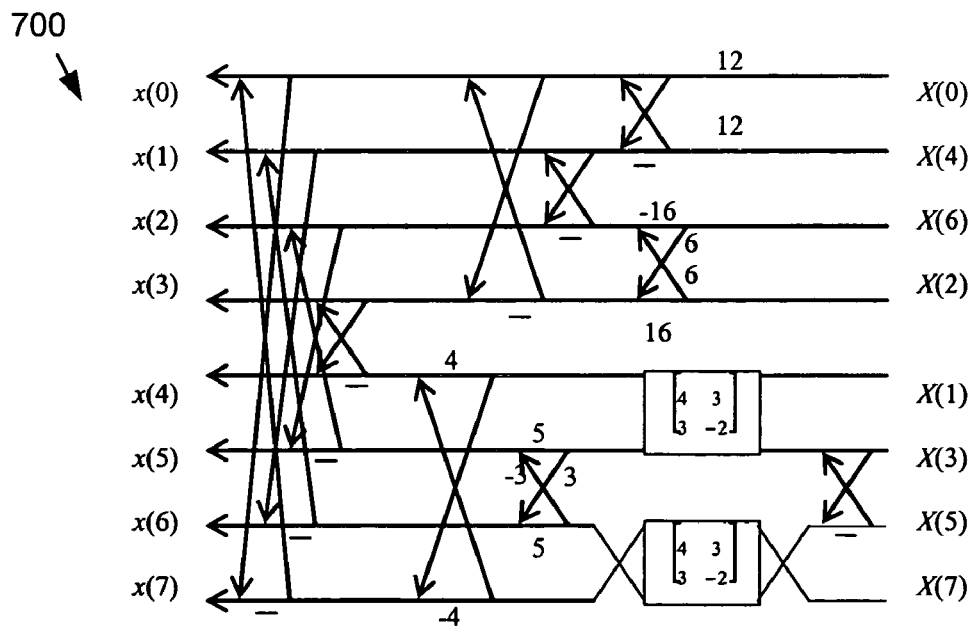
FIG. 7 is a block diagram of a fast implementation of the 8-point WMV9/VC-9 inverse transform without scaling.

The inverse transform is decomposed by one of two ways. A first alternative is to reverse the forward transform flow graph. Butterfly operations are inverted. In particular, butterflies of the type $$\begin{bmatrix} c & s \\ s & -c \end{bmatrix}$$

are their own inverses whereas those of the form $$\begin{bmatrix} c & -s \\ s & c \end{bmatrix}$$

are inverses of $$\begin{bmatrix} c & s \\ -s & c \end{bmatrix},$$

scaling being ignored in both cases. By reversing the forward transform flow graph, therefore, we get the fast inverse transform implementation shown in FIG. 7.

Figure 8:
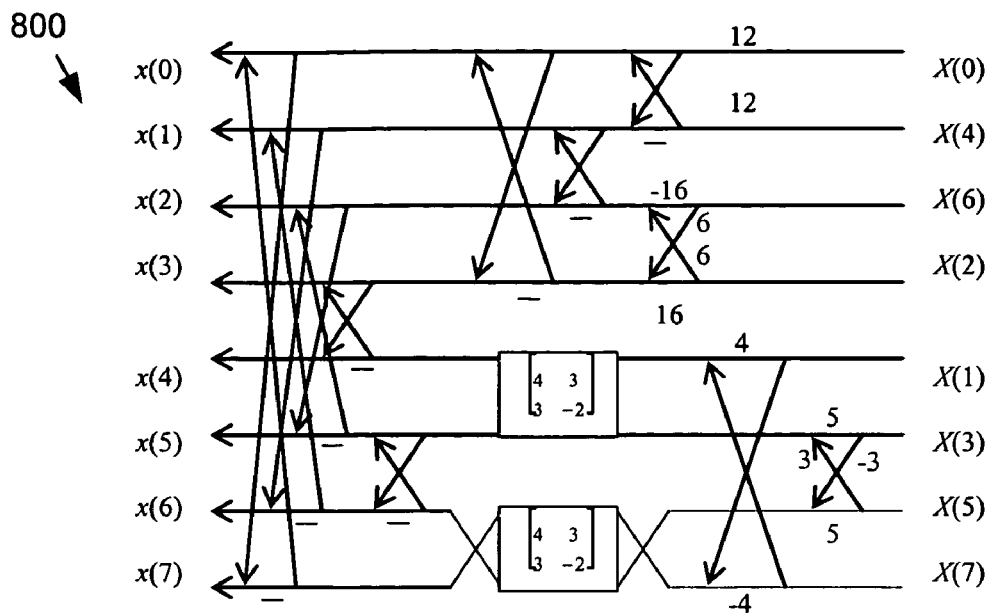
FIG. 8 is a block diagram of an alternative fast implementation of the 8-point WMV9/VC-9 inverse transform without scaling.

The second alternative is to note that $T^{odd}$ is a symmetric matrix. Therefore, the inverse transform also involves the same matrix multiply as the forward transform, i.e., the same butterflies and ordering can be maintained for the odd basis functions as for the forward transform. This implementation is shown in FIG. 8.

Figure 9:
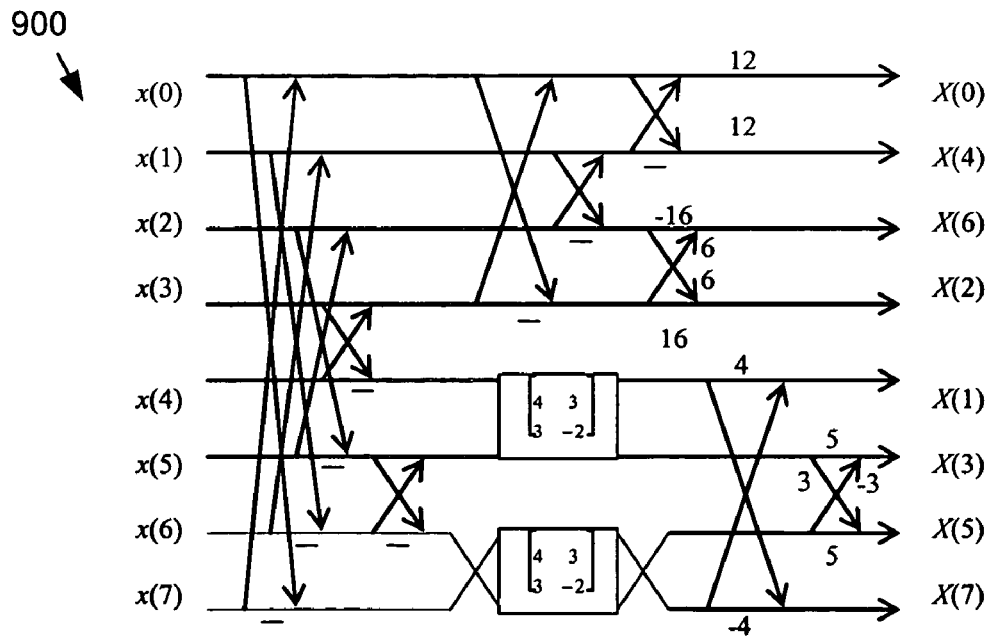
FIG. 9 is a block diagram of an Alternative fast implementation of the 8-point WMV9/VC-9 forward transform without scaling.

A forward transform based on the reversal of the above can also be generated. This provides the alternative fast implementation of the forward transform shown in FIG. 9.

5. Computing Environment

The above described fast implementations of the WMV9/VC-9 transforms can be performed on any of a variety of devices in which image and video signal processing is performed, including among other examples, computers; image and video recording, transmission and receiving equipment; portable video players; video conferencing; Web video streaming applications; and etc. The image and video coding techniques can be implemented in hardware circuitry (e.g., in circuitry of an ASIC, FPGA, etc.), as well as in image and video processing software executing within a computer or other computing environment (whether executed on the central processing unit (CPU), or dedicated graphics processor, video card or like), such as shown in FIG. 10.

Figure 10:
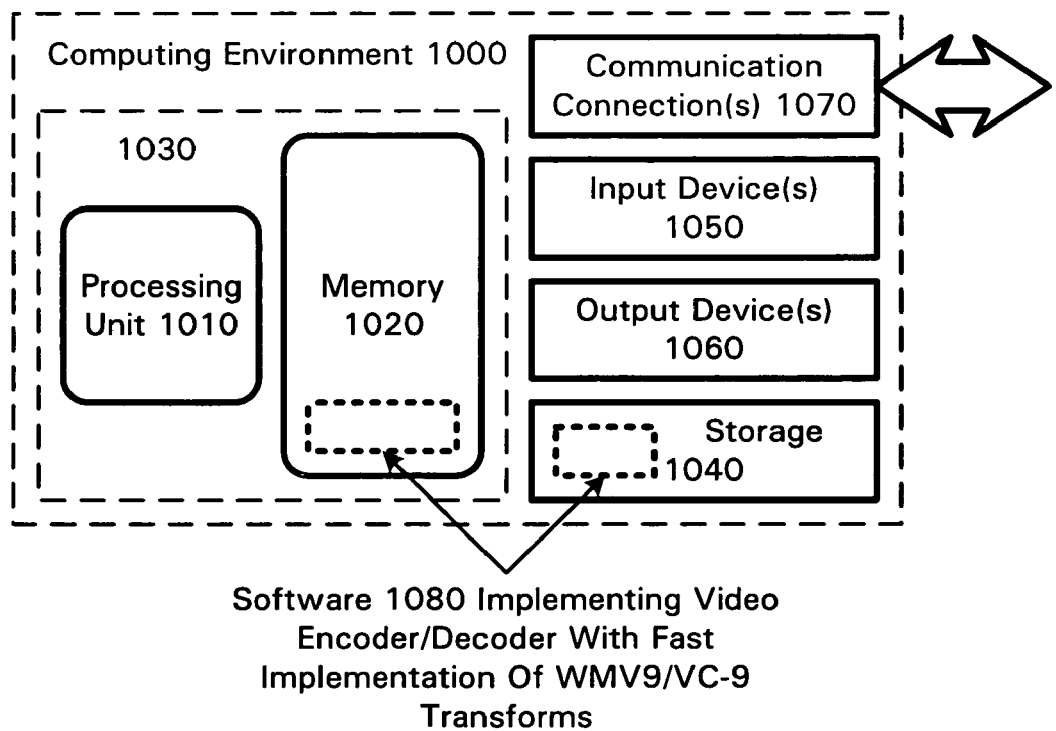
FIG. 10 is a block diagram of a suitable computing environment for the video encoder/decoder of FIGS. 1 and 2.

FIG. 10 illustrates a generalized example of a suitable computing environment (1000) in which the described fast WMV9/VC-9 transforms may be implemented. The computing environment (1000) is not intended to suggest any limitation as to scope of use or functionality of the invention, as the present invention may be implemented in diverse general-purpose or special-purpose computing environments.

With reference to FIG. 10, the computing environment (1000) includes at least one processing unit (1010) and memory (1020). In FIG. 10, this most basic configuration (1030) is included within a dashed line. The processing unit (1010) executes computer-executable instructions and may be a real or a virtual processor. In a multi-processing system, multiple processing units execute computer-executable instructions to increase processing power. The memory (1020) may be volatile memory (e.g., registers, cache, RAM), non-volatile memory (e.g., ROM, EEPROM, flash memory, etc.), or some combination of the two. The memory (1020) stores software (1080) implementing the described fast WMV9/VC-9 transforms.

A computing environment may have additional features. For example, the computing environment (1000) includes storage (1040), one or more input devices (1050), one or more output devices (1060), and one or more communication connections (1070). An interconnection mechanism (not shown) such as a bus, controller, or network interconnects the components of the computing environment (1000). Typically, operating system software (not shown) provides an operating environment for other software executing in the computing environment (1000), and coordinates activities of the components of the computing environment (1000).

The storage (1040) may be removable or non-removable, and includes magnetic disks, magnetic tapes or cassettes, CD-ROMs, CD-RWs, DVDs, or any other medium which can be used to store information and which can be accessed within the computing environment (1000). The storage (1040) stores instructions for the software (1080) implementing the audio encoder that that generates and compresses quantization matrices.

The input device(s) (1050) may be a touch input device such as a keyboard, mouse, pen, or trackball, a voice input device, a scanning device, or another device that provides input to the computing environment (1000). For audio, the input device(s) (1050) may be a sound card or similar device that accepts audio input in analog or digital form, or a CD-ROM reader that provides audio samples to the computing environment. The output device(s) (1060) may be a display, printer, speaker, CD-writer, or another device that provides output from the computing environment (1000).

The communication connection(s) (1070) enable communication over a communication medium to another computing entity. The communication medium conveys information such as computer-executable instructions, compressed audio or video information, or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

The transform and coding/decoding techniques herein can be described in the general context of computer-readable media. Computer-readable media are any available media that can be accessed within a computing environment. By way of example, and not limitation, with the computing environment (1000), computer-readable media include memory (1020), storage (1040), communication media, and combinations of any of the above.

The fast WMV9/VC-9 transforms herein can be described in the general context of computer-executable instructions, such as those included in program modules, being executed in a computing environment on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing environment.

For the sake of presentation, the detailed description uses terms like "determine," "generate," "adjust," and "apply" to describe computer operations in a computing environment. These terms are high-level abstractions for operations performed by a computer, and should not be confused with acts performed by a human being. The actual computer operations corresponding to these terms vary depending on implementation.

In view of the many possible embodiments to which the principles of our invention may be applied, we claim as our invention all such embodiments as may come within the scope and spirit of the following claims and equivalents thereto.

We claim:

1. A method of transform-coding media data in two-dimensional blocks using a fast transform implementation of a block transform of 8-points in at least one of the block's dimensions based on a transform matrix represented by $$T_8 = \begin{bmatrix} 12 & 12 & 12 & 12 & 12 & 12 & 12 & 12 \\ 16 & 15 & 9 & 4 & -4 & -9 & -15 & -16 \\ 16 & 6 & -6 & -16 & -16 & -6 & 6 & 16 \\ 15 & -4 & -16 & -9 & 9 & 16 & 4 & -15 \\ 12 & -12 & -12 & 12 & 12 & -12 & -12 & 12 \\ 9 & -16 & 4 & 15 & -15 & -4 & 16 & -9 \\ 6 & -16 & 16 & -6 & -6 & 16 & -16 & 6 \\ 4 & -9 & 15 & -16 & 16 & -15 & 9 & -4 \end{bmatrix},$$

the method comprising:
  receiving the media data;
  transform-coding the media data to an output data stream for compression or decompression, comprising in part by performing multiple stages of butterfly operations converting between an 8-point set of spatial domain co-efficients and 8-point transform domain co-efficients in the at least one 8-point dimension, the multiple stages comprising for odd transform domain co-efficients, performing a matrix multiply by the matrix, $$\begin{bmatrix} 4 & 3 \\ 3 & -2 \end{bmatrix};$$

and
  outputting the data stream.

2. A media system providing transform coding of a media data, comprising:
  a media data input for receiving the media data;
  a transform-based block coder for transform-coding the media data to an output data stream for compression or decompression, comprising in part:
    a forward transform stage operating, for a two dimensional block of the media data, to perform a forward transform of the block to convert the block into a transform domain,
    a quantization stage operating to quantize the transform-domain block;
    a dequantization stage operating to dequantize the transform-domain block; and
    an inverse transform stage for performing an inverse transform of the transform-domain block to produce a reconstructed block of the form, $$R = \frac{(T'_n \cdot D \cdot T_m)}{1024},$$

wherein at least one dimension $T_n$ or $T_m$ of the inverse transform is the 8-point matrix $$T_8 = \begin{bmatrix} 12 & 12 & 12 & 12 & 12 & 12 & 12 & 12 \\ 16 & 15 & 9 & 4 & -4 & -9 & -15 & -16 \\ 16 & 6 & -6 & -16 & -16 & -6 & 6 & 16 \\ 15 & -4 & -16 & -9 & 9 & 16 & 4 & -15 \\ 12 & -12 & -12 & 12 & 12 & -12 & -12 & 12 \\ 9 & -16 & 4 & 15 & -15 & -4 & 16 & -9 \\ 6 & -16 & 16 & -6 & -6 & 16 & -16 & 6 \\ 4 & -9 & 15 & -16 & 16 & -15 & 9 & -4 \end{bmatrix},$$

the inverse transform being implemented as a sequence of butterfly operations and a matrix multiply by the matrix, $$\begin{bmatrix} 4 & 3 \\ 3 & -2 \end{bmatrix};$$

and
  an output for outputting the output data stream.

3. A computer-readable medium carrying thereon computer-executable software instructions for effecting a method of transform-coding media data in two-dimensional blocks using a fast transform implementation of a block transform of 8-points in at least one of the block's dimensions based on a transform matrix represented by $$T_8 = \begin{bmatrix} 12 & 12 & 12 & 12 & 12 & 12 & 12 & 12 \\ 16 & 15 & 9 & 4 & -4 & -9 & -15 & -16 \\ 16 & 6 & -6 & -16 & -16 & -6 & 6 & 16 \\ 15 & -4 & -16 & -9 & 9 & 16 & 4 & -15 \\ 12 & -12 & -12 & 12 & 12 & -12 & -12 & 12 \\ 9 & -16 & 4 & 15 & -15 & -4 & 16 & -9 \\ 6 & -16 & 16 & -6 & -6 & 16 & -16 & 6 \\ 4 & -9 & 15 & -16 & 16 & -15 & 9 & -4 \end{bmatrix},$$

the method comprising:

receiving the media data;

transform-coding the media data to an output data stream for compression or decompression, comprising in part by performing multiple stages of butterfly operations converting between an 8-point set of spatial domain co-efficients and 8-point transform domain co-efficients in the at least one 8-point dimension, the multiple stages comprising for odd transform domain co-efficients, performing a matrix multiply by the matrix, $$\begin{bmatrix} 4 & 3 \\ 3 & -2 \end{bmatrix};$$

and outputting the data stream.

4. A method of transform coding-based compression or decompression of two-dimensional media blocks using fast transform of a two-dimensional block of image data between spatial and transform domain representations, where at least one dimension of the block is 8 points, the transform coding-based compression/decompression method comprising;

receiving the media data;

transform-coding the media data to an output data stream for compression or decompression, comprising in part by, for a forward transform:

performing a sequence of butterfly operations of the type $$\begin{bmatrix} c & s \\ s & -c \end{bmatrix}$$

on a set of variables 0 through 7, including at least, a butterfly operation of variables 0 and 7, where values c and s are 1;

a butterfly operation of variables 1 and 6, where values c and s are 1;

a butterfly operation of variables 2 and 5, where values c and s are 1;

a butterfly operation of variables 3 and 4, where values c and s are 1;

a butterfly operation of variables 0 and 3, where values c and s are 1;

a butterfly operation of variables 1 and 2, where values c and s are 1;

a butterfly operation of variables 0 and 1, where values c and s are 1, with a scaling by 12;

a butterfly operation of variables 3 and 2, where values c and s are 16 and 6;

a butterfly operation of variables 4 and 7, where values c and s are 4 and 1;

a butterfly operation of variables 5 and 6, where values c and s are 5 and 3, followed by negating the variable 6;

a second butterfly operation of variables 5 and 6, where values c and s are 1; and prior to the second butterfly operation of variables 5 and 6, performing a matrix multiply of variables 4 and 5 and variables 7 and 6 by the matrix, $$\begin{bmatrix} 4 & 3 \\ 3 & -2 \end{bmatrix};$$

whereby the variables 0 through 3 produce even co-efficients and variables 4 through 7 produce odd co-efficients in the transform domain; and outputting the data stream.

5. The transform coding-based compression or decompression method of claim 4, comprising, for an inverse transform:

performing inverses of the butterfly operations in reverse flow of the forward transform.

6. A method of transform coding-based compression or decompression of two-dimensional media blocks using fast transform of a two-dimensional block of image data between spatial and transform domain representations, where at least one dimension of the block is 8 points, the transform coding-based compression/decompression method comprising;

receiving the media data;

transform-coding the media data to an output data stream for compression or decompression, comprising in part by, for an inverse transform:

performing a sequence of butterfly operations of the type $$\begin{bmatrix} c & s \\ s & -c \end{bmatrix}$$

on a set of variables 0 through 7, where variables 0 through 3 are even transform co-efficients and variables 4 through 7 are odd transform co-efficients, including at least, a butterfly operation of variables 5 and 6, where values c and s are 1;

a second butterfly operation of variables 6 and 5, where values c and s are 5 and 3, followed by negating the variable 5;

a butterfly operation of variables 4 and 7, where values c and s are 4 and 1;

a butterfly operation of variables 0 and 1, where values c and s are 1, with a scaling by 12;

a butterfly operation of variables 3 and 2, where values c and s are 16 and 6;

a butterfly operation of variables 1 and 2, where values c and s are 1;

a butterfly operation of variables 0 and 3, where values c and s are 1;

a butterfly operation of variables 3 and 4, where values c and s are 1;

a butterfly operation of variables 2 and 5, where values c and s are 1;

a butterfly operation of variables 1 and 6, where values c and s are 1;

a butterfly operation of variables 0 and 7, where values c and s are 1; and prior to the second butterfly operation of variables 5 and 6, performing a matrix multiply of variables 4 and 5 and variables 7 and 6 by the matrix, $$\begin{bmatrix} 4 & 3 \\ 3 & -2 \end{bmatrix};$$

and
outputting the data stream.

7. A method of transform coding-based compression or decompression of two-dimensional media blocks using fast transform of a two-dimensional block of image data between spatial and transform domain representations, where at least one dimension of the block is 8 points, the transform coding-based compression/decompression method comprising;
receiving the media data;
transform-coding the media data to an output data stream for compression or decompression, comprising in part by, for an inverse transform:
performing a sequence of butterfly operations of the type $$\begin{bmatrix} c & s \\ s & -c \end{bmatrix}$$

on a set of variables 0 through 7, where variables 0 through 3 are even transform co-efficients and variables 4 through 7 are odd transform co-efficients, including at least,
a butterfly operation of variables 5 and 6, where values c and s are 5 and 3, followed by negating the variable 6;
a butterfly operation of variables 4 and 7, where values c and s are 4 and 1;
a second butterfly operation of variables 5 and 6, where values c and s are 1;
a butterfly operation of variables 0 and 1, where values c and s are 1, with a scaling by 12;
a butterfly operation of variables 3 and 2, where values c and s are 16 and 6;
a butterfly operation of variables 1 and 2, where values c and s are 1;
a butterfly operation of variables 0 and 3, where values c and s are 1;
a butterfly operation of variables 3 and 4, where values c and s are 1;
a butterfly operation of variables 2 and 5, where values c and s are 1;
a butterfly operation of variables 1 and 6, where values c and s are 1;
a butterfly operation of variables 0 and 7, where values c and s are 1; and
following the butterfly operation of variables 4 and 7 and prior to the second butterfly operation of variables 5 and 6, performing a matrix multiply of variables 4 and 5 and variables 7 and 6 by the matrix, $$\begin{bmatrix} 4 & 3 \\ 3 & -2 \end{bmatrix}.$$

and
outputting the data stream.

8. The transform coding-based compression/decompression method of claim 7, wherein said transform-coding the media data to an output data stream for compression or decompression, comprises in part by, for a forward transform:
performing inverses of the butterfly operations in reverse flow of the forward transform.

9. A method of transform coding-based compression or decompression of two-dimensional media blocks using fast transform of a two-dimensional block of image data between spatial and transform domain representations, where at least one dimension of the block is 8 points, the transform coding-based compression/decompression method comprising;
receiving the media data;
transform-coding the media data to an output data stream for compression or decompression, comprising in part by, for a forward transform:
performing a sequence of butterfly operations of the type $$\begin{bmatrix} c & s \\ s & -c \end{bmatrix}$$

on a set of variables 0 through 7, including at least,
a butterfly operation of variables 0 and 7, where values c and s are 1;
a butterfly operation of variables 1 and 6, where values c and s are 1;
a butterfly operation of variables 2 and 5, where values c and s are 1;
a butterfly operation of variables 3 and 4, where values c and s are 1;
a butterfly operation of variables 0 and 3, where values c and s are 1;
a butterfly operation of variables 1 and 2, where values c and s are 1;
a butterfly operation of variables 0 and 1, where values c and s are 1, with a scaling by 12;
a butterfly operation of variables 3 and 2, where values c and s are 16 and 6;
a first butterfly operation of variables 5 and 6, where values c and s are 1;
a butterfly operation of variables 4 and 7, where values c and s are 4 and 1;
a second butterfly operation of variables 6 and 5, where values c and s are 5 and 3, followed by negating the variable 5; and
following the first butterfly operation of variables 5 and 6 and prior to the butterfly operation of variables 4 and 7, performing a matrix multiply of variables 4 and 5 and variables 7 and 6 by the matrix, $$\begin{bmatrix} 4 & 3 \\ 3 & -2 \end{bmatrix};$$

whereby the variables 0 through 3 produce even co-efficients and variables 4 through 7 produce odd co-efficients in the transform domain; and
outputting the data stream.

10. A two-dimensional media compression processor for performing transform-based compression/decompression of two-dimensional media blocks, wherein the transform in at least one 8-point dimension of the blocks is based on the transform matrix, $$T_8 = \begin{bmatrix} 12 & 12 & 12 & 12 & 12 & 12 & 12 & 12 \\ 16 & 15 & 9 & 4 & -4 & -9 & -15 & -16 \\ 16 & 6 & -6 & -16 & -16 & -6 & 6 & 16 \\ 15 & -4 & -16 & -9 & 9 & 16 & 4 & -15 \\ 12 & -12 & -12 & 12 & 12 & -12 & -12 & 12 \\ 9 & -16 & 4 & 15 & -15 & -4 & 16 & -9 \\ 6 & -16 & 16 & -6 & -6 & 16 & -16 & 6 \\ 4 & -9 & 15 & -16 & 16 & -15 & 9 & -4 \end{bmatrix},$$

the processor comprising:

means for input of the media blocks;

means for transform-coding the media data to an output data stream for compression or decompression, comprising means for performing a sequence of butterfly operations of the type $$\begin{bmatrix} c & s \\ s & -c \end{bmatrix}$$

on a set of variables 0 through 7, where variables 0 through 3 are even transform co-efficients and variables 4 through 7 are odd transform co-efficients, including at least, a butterfly operation of variables 0 and 7, where values c and s are 1;

a butterfly operation of variables 1 and 6, where values c and s are 1;

a butterfly operation of variables 2 and 5, where values c and s are 1;

a butterfly operation of variables 3 and 4, where values c and s are 1;

a butterfly operation of variables 0 and 3, where values c and s are 1;

a butterfly operation of variables 1 and 2, where values c and s are 1;

a butterfly operation of variables 0 and 1, where values c and s are 1, with a scaling by 12;

a butterfly operation of variables 3 and 2, where values c and s are 16 and 6;

a butterfly operation of variables 4 and 7, where values c and s are 4 and 1;

a butterfly operation of variables 5 and 6, where values c and s are 5 and 3, followed by negating the variable 6;

a second butterfly operation of variables 5 and 6, where values c and s are 1; and means for performing a matrix multiply of variables 4 and 5 and variables 7 and 6 by the matrix, $$\begin{bmatrix} 4 & 3 \\ 3 & -2 \end{bmatrix}$$

prior to the second butterfly operation of variables 5 and 6; and means for output of the output data stream.

11. A two-dimensional media compression processor for performing transform-based compression/decompression of two-dimensional media blocks, wherein the transform in at least one 8-point dimension of the blocks is based on the transform matrix, $$T_8 = \begin{bmatrix} 12 & 12 & 12 & 12 & 12 & 12 & 12 & 12 \\ 16 & 15 & 9 & 4 & -4 & -9 & -15 & -16 \\ 16 & 6 & -6 & -16 & -16 & -6 & 6 & 16 \\ 15 & -4 & -16 & -9 & 9 & 16 & 4 & -15 \\ 12 & -12 & -12 & 12 & 12 & -12 & -12 & 12 \\ 9 & -16 & 4 & 15 & -15 & -4 & 16 & -9 \\ 6 & -16 & 16 & -6 & -6 & 16 & -16 & 6 \\ 4 & -9 & 15 & -16 & 16 & -15 & 9 & -4 \end{bmatrix},$$

the processor comprising:

means for input of the media blocks;

means for transform-coding the media data to an output data stream for compression or decompression, comprising means for performing a sequence of butterfly operations of the type $$\begin{bmatrix} c & s \\ s & -c \end{bmatrix}$$

on a set of variables 0 through 7, where variables 0 through 3 are even transform co-efficients and variables 4 through 7 are odd transform co-efficients, including at least, a butterfly operation of variables 5 and 6, where values c and s are 1;

a second butterfly operation of variables 6 and 5, where values c and s are 5 and 3, followed by negating the variable 5;

a butterfly operation of variables 4 and 7, where values c and s are 4 and 1;

a butterfly operation of variables 0 and 1, where values c and s are 1, with a scaling by 12;

a butterfly operation of variables 3 and 2, where values c and s are 16 and 6;

a butterfly operation of variables 1 and 2, where values c and s are 1;

a butterfly operation of variables 0 and 3, where values c and s are 1;

a butterfly operation of variables 3 and 4, where values c and s are 1;

a butterfly operation of variables 2 and 5, where values c and s are 1;

a butterfly operation of variables 1 and 6, where values c and s are 1;

a butterfly operation of variables 0 and 7, where values c and s are 1; and means for performing a matrix multiply of variables 4 and 5 and variables 7 and 6 by the matrix, $$\begin{bmatrix} 4 & 3 \\ 3 & -2 \end{bmatrix}$$

prior to the second butterfly operation of variables 5 and 6; and means for output of the output data stream.

12. A two-dimensional media compression processor for performing transform-based compression/decompression of two-dimensional media blocks, wherein the transform in at least one 8-point dimension of the blocks is based on the transform matrix, $$T_8 = \begin{bmatrix} 12 & 12 & 12 & 12 & 12 & 12 & 12 & 12 \\ 16 & 15 & 9 & 4 & -4 & -9 & -15 & -16 \\ 16 & 6 & -6 & -16 & -16 & -6 & 6 & 16 \\ 15 & -4 & -16 & -9 & 9 & 16 & 4 & -15 \\ 12 & -12 & -12 & 12 & 12 & -12 & -12 & 12 \\ 9 & -16 & 4 & 15 & -15 & -4 & 16 & -9 \\ 6 & -16 & 16 & -6 & -6 & 16 & -16 & 6 \\ 4 & -9 & 15 & -16 & 16 & -15 & 9 & -4 \end{bmatrix},$$

the processor comprising:
   means for input of the media blocks;
   means for transform-coding the media data to an output data stream for compression or decompression, comprising means for performing a sequence of butterfly operations of the type $$\begin{bmatrix} c & s \\ s & -c \end{bmatrix}$$

on a set of variables 0 through 7, where variables 0 through 3 are even transform co-efficients and variables 4 through 7 are odd transform co-efficients, including at least,
   a butterfly operation of variables 5 and 6, where values c and s are 5 and 3, followed by negating the variable 6;
   a butterfly operation of variables 4 and 7, where values c and s are 4 and 1;
   a second butterfly operation of variables 5 and 6, where values c and s are 1;
   a butterfly operation of variables 0 and 1, where values c and s are 1, with a scaling by 12;
   a butterfly operation of variables 3 and 2, where values c and s are 16 and 6;
   a butterfly operation of variables 1 and 2, where values c and s are 1;
   a butterfly operation of variables 0 and 3, where values c and s are 1;
   a butterfly operation of variables 3 and 4, where values c and s are 1;
   a butterfly operation of variables 2 and 5, where values c and s are 1;
   a butterfly operation of variables 1 and 6, where values c and s are 1;
   a butterfly operation of variables 0 and 7, where values c and s are 1; and means for performing a matrix multiply of variables 4 and 5 and variables 7 and 6 by the matrix, $$\begin{bmatrix} 4 & 3 \\ 3 & -2 \end{bmatrix}$$

following the butterfly operation of variables 4 and 7 and prior to the second butterfly operation of variables 5 and 6; and
   means for output of the output data stream.

13. A two-dimensional media compression processor for performing transform-based compression/decompression of two-dimensional media blocks, wherein the transform in at least one 8-point dimension of the blocks is based on the transform matrix, $$T_8 = \begin{bmatrix} 12 & 12 & 12 & 12 & 12 & 12 & 12 & 12 \\ 16 & 15 & 9 & 4 & -4 & -9 & -15 & -16 \\ 16 & 6 & -6 & -16 & -16 & -6 & 6 & 16 \\ 15 & -4 & -16 & -9 & 9 & 16 & 4 & -15 \\ 12 & -12 & -12 & 12 & 12 & -12 & -12 & 12 \\ 9 & -16 & 4 & 15 & -15 & -4 & 16 & -9 \\ 6 & -16 & 16 & -6 & -6 & 16 & -16 & 6 \\ 4 & -9 & 15 & -16 & 16 & -15 & 9 & -4 \end{bmatrix},$$

the processor comprising:
   means for input of the media blocks;
   means for transform-coding the media data to an output data stream for compression or decompression, comprising means for performing a sequence of butterfly operations of the type $$\begin{bmatrix} c & s \\ s & -c \end{bmatrix}$$

on a set of variables 0 through 7, where variables 0 through 3 are even transform co-efficients and variables 4 through 7 are odd transform co-efficients, including at least,
   a butterfly operation of variables 0 and 7, where values c and s are 1;
   a butterfly operation of variables 1 and 6, where values c and s are 1;
   a butterfly operation of variables 2 and 5, where values c and s are 1;
   a butterfly operation of variables 3 and 4, where values c and s are 1;
   a butterfly operation of variables 0 and 3, where values c and s are 1;
   a butterfly operation of variables 1 and 2, where values c and s are 1;
   a butterfly operation of variables 0 and 1, where values c and s are 1, with a scaling by 12;
   a butterfly operation of variables 3 and 2, where values c and s are 16 and 6;
   a first butterfly operation of variables 5 and 6, where values c and s are 1;
   a butterfly operation of variables 4 and 7, where values c and s are 4 and 1;
   a second butterfly operation of variables 6 and 5, where values c and s are 5 and 3, followed by negating the variable 5; and
   means for performing a matrix multiply of variables 4 and 5 and variables 7 and 6 by the matrix, $$\begin{bmatrix} 4 & 3 \\ 3 & -2 \end{bmatrix}$$

following the first butterfly operation of variables 5 and 6 and prior to the butterfly operation of variables 4 and 7; and
   means for output of the output data stream.

* * * * *